United States Patent Office 3,337,754
Patented Aug. 22, 1967

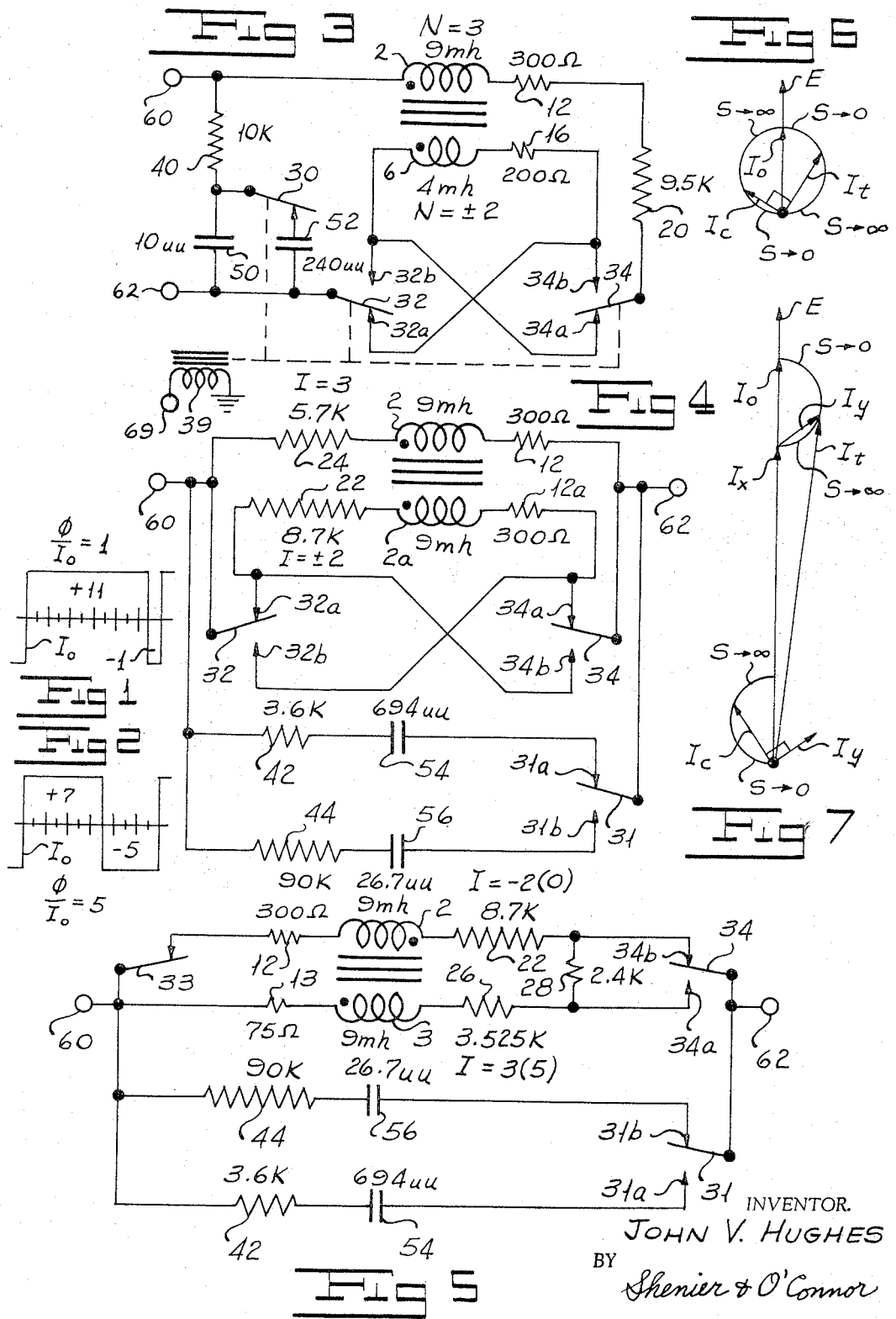

3,337,754
VARIABLE AMPLITUDE PULSE TORQUER
John V. Hughes, West Hartford, Conn., assignor to United Aircraft Corporation, East Hartford, Conn., a corporation of Delaware
Filed July 31, 1963, Ser. No. 298,955
13 Claims. (Cl. 307—106)

My invention relates to pulse torquers and more particularly to torquers in which both the amplitude and the width of pulses are varied.

In the prior art, current pulses of predetermined amplitude-time integral have been applied to the forcing windings of accelerometers and gyroscopes. The use of such discrete pulses is especially advantageous for systems employing digital computation. In some pulse torquing systems of the prior art no provision is made for varying either the pulse duration or the pulse amplitude. Such systems providing pulses of but a single amplitude-time integral exhibit serious disadvantages where the corresponding inertial input of acceleration or angular rate approaches zero.

One disadvantage is that the system exhibits poor proportionality of response. This occasions a large noise factor which can be reduced only by smoothing. Such smoothing decreases the frequency response of the system.

A second disadvantage is if any inequivalence between positive polarity and negative polarity pulses exists, then an extraneous drift is introduced. For a given amount of inequivalence of positive and negative pulses the inequivalence drift is proportional to the amplitude-time integral of a pulse. Accordingly, to minimize inequivalence drift, pulses of low amplitude-time integral should be employed for small inertial inputs while pulses of high amplitude-time integral should be employed for large inertial inputs.

One system of the pior art completely overcomes the first disadvantage relating to proportionality and halves the inequivalence drift. Such system has been termed the "forced limit cycle." In the forced limit cycle, the time period required for each cycle is constant. However, each cycle consists of a positive pulse and a negative pulse of the same amplitude. For inertial inputs approaching zero, the positive and negative pulses of each cycle are of substantially equal duration, while for large inertial inputs of the duration of one pulse of the cycle is augmented and the duration of the other pulse of the cycle is diminished. This pulse-duration modulation provides substantially proportional variation in the resultant amplitude-time integral over a complete cycle. Furthermore for small inertial inputs, the inequivalence error is reduced by a factor of two, since each positive and negative pulse has a duration of half the cycle period. However, the forced limit cycle retains an unacceptably large inequivalence drift for small inertial inputs, where the durations of positive and negative current over a cycle are substantially equal.

Since pulse duration modulation fails to overcome inequivalence drift, it is necessary to employ pulse amplitude modulation so that pulses of small amplitude are used for inertial inputs approaching zero.

Amplitude modulation has not heretofore been thought practical since varying the current through the forcing winding varies its power dissipation. The accuracy of a gyroscope or accelerometer depends not only upon maintaining the mean or average temperature of the instrument constant, but also upon maintaining constant the temperature gradients existing between the various portions of the instrument. Thus the use of an auxiliary heater controlled by the mean temperature of the instrument as measured at a given point fails to maintain the accurate functioning of the instrument, since there is no assurance that the temperature gradients throughout the instrument remain constant. The variation in power dissipated by the forcing winding thus changes not only the mean temperature of the instrument but also the temperature distribution throughout the instrument.

One object of my invention is to provide a variable amplitude pulse torquer which presents a constant impedance to a current source.

Another object of my invention is to provide a pulse torquer of variable amplitude which draws a constant current.

Still another object of my invention is to provide a variable amplitude pulse torquer of constant power dissipation.

A further object of my invention is to provide a variable amplitude pulse torquer in which the spatial distribution of power dissipation is constant.

A still further object of my invention is to provide a variable amplitude pulse torquer which presents a purely resistive impedance.

Other and further objects of my invention will be seen from the following description.

In general my invention contemplates the provision of a pair of forcing windings. In one embodiment of my invention the windings have different numbers of turns and are selectively connected in either series-aiding or series-opposing relationship. In a second embodiment of my invention the windings may have equal numbers of turns but pass different currents; and the windings are selectively coupled either in parallel-aiding or parallel-opposing relationship. The second embodiment of my invention also includes a configuration where the parallel connected windings have different numbers of turns but pass equal currents. In both the first and second embodiments the currents flowing through the two windings, whether in aiding or opposing relationship, are the same. Thus no change occurs in either the mean power dissipation or in the spatial distribution of power dissipation. In a third embodiment of my invention a pair of bifilar conductors, simultaneously wound, form two forcing windings having the same spatial distribution. The windings are connected in parallel-opposing relationship. The currents through the windings are selectively varied while maintaining the total current through the parallel-connected windings constant. The resistances of the windings are such that total power dissipated in the two windings remains constant even though the power dissipated by each individual winding varies. Since the spatial distribution of the pair of simultaneously wound windings is the same, the temperature distribution over the instrument remains, for practical purposes, absolutely constant. In all embodiments of my invention, capacitive compensating networks are provided so that the torquer circuit presents a purely resistive impedance, independent of frequency.

In the accompanying drawings which form part of the instant specification and which are to be read in conjunction therewith and in which like reference numerals are used to indicate like parts in the various views:

FIGURE 1 is a graph of torquer current against time for the maximum inertial input which may be accommodated with the windings connected for low sensitivity.

FIGURE 2 is a graph of torquer current against time for the minimum inertial input which may be accommodated with the windings connected for high sensitivity.

FIGURE 3 is a schematic view showing the first embodiment of my invention.

FIGURE 4 is a schematic view showing one form of the second embodiment of my invention.

FIGURE 5 is a schematic view showing one form of the third embodiment of my invention.

FIGURE 6 is a circle diagram for compensating networks used in FIGURES 3 through 5.

FIGURE 7 is a circle diagram for compensating networks employed in FIGURES 4 and 5.

Referring now more particularly to FIGURE 1, assume that the period of the forced limit cycle is divided into twelve equal and discrete steps. With the forcing windings connected to provide low sensitivity so that the net armature cross-field flux $\phi$ per unit of current $I_o$ is low, the maximum inertial input which can be accommodated would be eleven steps of one polarity and one step of the opposite polarity thus yielding a resultant flux of $$\frac{(11-1)}{12}I_o = \frac{10}{12}I_o$$

maxwells, assuming that the ratio of net armature cross-field flux to total torquer input current $I_o$ is unity ($\phi/I_o = 1$ maxwell/ampere).

Assume in FIGURE 2 that the windings when connected for high sensitivity produce five times the armature cross-field flux for the same total torquer input current $I_o$ and thus that the ratio $\phi/I_o = 5$ maxwells/ampere. In FIGURE 2 the net flux-time integral over one forced limit cycle will comprise seven steps of one polarity and five steps of the opposite polarity yielding a resultant of $$\frac{(7-5)}{12}5I_o = \frac{10}{12}I_o$$

maxwells. Thus an increase in torquer sensitivity $\phi/I_o$ permits the same inertial input to be measured with the durations of positive and negative polarity displaced only one step from equality and hence increases the maximum measurable inertial input.

In FIGURES 1 and 2, as will be pointed out in detail hereinafter, the period for the forced limit cycle is assumed, by way of example, to be 420 microseconds and comprises twelve steps each of 35 $\mu$sec. Accordingly, the repetition frequency of the forced limit cycle is 2.38 kilocycles.

Referring now to FIGURE 3, one torquer winding 2 has a number of turns $N=3$. The second torquer winding 6 has a number of turns $N=2$. This permits the net turns to be changed from $3+2=5$ to $3-2=1$ and affords a five-to-one ratio of sensitivities. Since inductance varies as the square of the turns, it will be appreciated that if winding 2 has an inductance of 9 millihenrys then winding 6 has an inductance of 4 mh. Assuming that windings 2 and 6 are wound with wires of the same size and material, then their resistances 12 and 16 will be proportional to the number of turns. If winding 2 has a resistance 12 of 300 ohms, then winding 6 has a resistance 16 of 200 ohms. A terminal 60 is serially connected through winding 2 and a 9.5K resistor 20 to the armature of a double-throw switch 34 which is provided with contacts 34a and 34b. I provide a second double-throw switch 32 which is provided with contacts 32a and 32b and is simultaneously actuated with switch 34 to form a double-pole, double-throw reversing switch. Contact 34a is connected to contact 32b; and contact 34b is connected to contact 32a. Contact 32b is connected through winding 6 to contact 34b; and the armature of switch 32 is coupled to a terminal 62. Terminal 60 is connected through a 10K resistor 40 to the armature of a single-throw switch 30 which is actuated in synchronism with reversing switches 32 and 34. The contact of switch 30 is connected through a 240 micro-microfarad ($\mu\mu$) or picofarad (pf.) capacitor 52 to terminal 62. The armature of switch 30 is connected through a 10 $\mu\mu$ (pf.) capacitor 50 to terminal 62. In the positions of the three simultaneously actuated switches shown, the armature of switch 30 engages its contact; the armature of switch 32 engages contact 32a and the armature of switch 34 engages contact 34a. The switches may comprise a relay having an actuating coil 39 connected between an energizing terminal 69 and ground. It will be understood that high speed electronic gates may be substituted in all embodiments of my invention for the relay switches shown.

From the indicated polarity markings on windings 2 and 6, it will be appreciated that in the position of the switches shown, current flows through the windings in series aiding fashion to produce high sensitivity and thus a high ratio $\phi/I_o$. Upon actuation of the reversing switches 32 and 34, windings 2 and 6 are connected in series opposition to produce a low sensitivity and accordingly a low ratio of $\phi/I_o$.

It is desired that inequivalence of the positive and negative pulses be less than one part in a million. Accordingly, it is necessary that the inductive time-constant of the torquer not exceed one-fourteenth of the 35 $\mu$sec. steps into which the forced limit cycle is divided, since $$e^{-14} = 10^{-6}$$

Hence, the inductive time-constant of the torquer should not exceed $$\frac{35 \times 10^{-6}}{14} = 2.5 \ \mu\text{sec.}$$

It may be properly assumed that the coefficient of coupling between windings 2 and 6 is substantially unity so that the mutual inductance is equal to the square root of the product of the self-inductances and thus equal to $\sqrt{(9 \times 10^{-3})(4 \times 10^{-3})} = 6$ mh. The total inductance of the windings in series aiding is thus $$9 \times 10^{-3} + 4 \times 10^{-3} + 2(6 \times 10^{-3}) = 25 \ \text{mh.}$$

The total series resistance necessary to achieve the desired time-constant is $$\frac{25 \times 10^{-3}}{2.5 \times 10^{-6}} = 10K$$

The desired total resistance of 10K is produced by the 9.5K resistor 20 in series with the winding resistances 12 and 16. It will be noted that with the windings in series opposition the net inductance is $$9 \times 10^{-3} + 4 \times 10^{-3} - 2(6 \times 10^{-3}) = 1 \ \text{mh.}$$

and the time-constant is reduced to $$\frac{1 \times 10^{-3}}{10 \times 10^3} = 0.1 \ \mu\text{sec.}$$

Accordingly with the windings in series opposition the inequivalency error is infinitesimal being equal to $$e^{-350} = 10^{-152}$$

Referring now to FIGURE 6 let E represent the desired voltage of constant absolute magnitude which periodically reverses polarity at terminals 60 and 62. It is desired that the net impedance presented between these terminals be purely resistive and thus that $I_o$ be in phase with E. Let the current flowing through the torquer itself be $I_t$. From the circle diagram of FIGURE 6 it will be noted that as complex frequency S approaches zero $I_t$ approaches $I_o$, whereas as complex frequency S approaches infinity $I_t$ lags E by 90° and approaches zero. It is desired to provide a compensating current $I_c$ such that the sum of $I_t$ and $I_c$ always equals $I_o$ irrespective of frequency. The compensating circuit including capacitors 50 and 52 provides the compensating current $I_c$. As complex frequency S approaches infinity $I_c$ approaches $I_o$ while as complex frequency S approaches zero $I_c$ leads E by 90° and approaches zero. In order that the current through resistor 40 be equal to $I_o$ as S approaches infinity it is necessary that its resistance value be 10K which is equal to the direct-current component of resistance of the torquer circuit itself. The circle diagram shown in FIGURE 6 will obtain provided the capacitive time-constant of the compensating circuit is equal to the inductive time-constant of the torquer circuit. For high sensitivity and a torquer time-constant of 2.5 μsec., the required capacitance value is $$\frac{2.5 \times 10^{-6}}{10 \times 10^3} = 250 \mu\mu$$

With the windings connected for low sensitivity and a corresponding time-constant of 0.1 μsec. the required capacitance value is $$\frac{0.1 \times 10^{-6}}{10 \times 10^3} = 10 \mu\mu$$

Accordingly, capacitor 50 has a value of 10 μμ while capacitor 52 has a value of 240 μμ so that the sum is 250 μμ. It will be appreciated that with the switches in the position shown the torquer is connected for high sensitivity yielding a large time-constant and correspondingly the armature of switch 30 engages its contact to provide a large capacitance. Upon simultaneous actuation of all switches so that the windings are connected for low sensitivity, yielding a short time-constant, capacitor 52 is disconnected from the compensating circuit to provide a low capacitance and a correspondingly short time-constant. Irrespective of the polarity of the series connection of the windings, the impedance between terminals 60 and 62 is a pure 10K resistance.

The currents through the windings exponentially approach the same final value whether connected in aiding or opposing relationship. Accordingly, the $I^2R$ power loss of each winding and the spatial distribution of power dissipation remain, for practical purposes, constant.

Referring now to FIGURE 4, torquer windings 2 and 2a have the same number of turns. The windings may have inductances of 9 mh. and, if wound with wires of the same size and material, equal corresponding resistances 12 and 12a of 300 ohms. Winding 2 is connected in series with a 5.7K resistor 24 between terminals 60 and 62 which, in turn, are connected to the respective armatures of the reversing switches 32 and 34. Winding 2a is connected in series with an 8.7K resistor 22 between contact 32a and contact 34a. Contact 32a is connected to contact 34b; and contact 34a is connected to contact 32b. Terminal 60 is serially connected through a 3.6K resistor 42 and a 694 μμ capacitor 54 to one contact 31a of a double-throw switch 31. Terminal 60 is also serially connected through a 90K resistor 44 and a 26.7 μμ capacitor 56 to contact 31b of switch 31. In the position of the three simultaneously actuated switches shown, the armature of reversing switch 32 engages contact 32a; the armature of reversing switch 34 engages contact 34a; and the armature of switch 31 engages contact 31a.

It is desired that the currents through windings 2 and 2a be in the ratio of three-to-two. From the indicated polarity markings, it will be noted that in the position of the switches shown, current flows through the windings in parallel aiding fashion to produce high sensitivity. Upon actuation of reversing switches 32 and 34, windings 2 and 2a are connected in parallel opposition to produce low sensitivity.

With the switches in the high sensitivity, parallel-aiding, position shown and assuming a coefficient of coupling of unity, then the mutual inductance between windings 2 and 2a will be substantially equal to the self-inductance L of either winding. Let $R_1$ be the total resistance of resistors 24 and 12, and $I_1$ the current therethrough; and let $R_2$ represent the total resistance of resistors 22 and 12a, and $I_2$ the current therethrough.

If S represents complex frequency, then (1) $\quad E = I_1(SL+R_1) + SLI_2$ (2) $\quad E = I_2(SL+R_2) + SLI_1$ Simultaneously solving Equations 1 and 2, (3) $\quad I_1 = \dfrac{ER_2}{R_1R_2 + SL(R_1+R_2)}$ (4) $\quad I_2 = \dfrac{ER_1}{R_1R_2 + SL(R_1+R_2)}$ Adding Equations 3 and 4 to obtain the total torquer current $I_t$, (5) $\quad I_t = I_1 + I_2 = \dfrac{E(R_1+R_2)}{R_1R_2 + SL(R_1+R_2)}$ From the denominator of Equation 5 the inductive torquer time-constant T is found to be (6) $\quad T = \dfrac{L}{R_p}$ where $R_p$ is the parallel equivalent resistance of $R_1$ and $R_2$ which is (7) $\quad R_p = \dfrac{R_1R_2}{R_1+R_2}$ To reduce the inequivalence of positive and negative pulses to less than $10^{-6}$ it is again necessary that the inductive time-constant of the torquer not exceed 2.5 μsec. Substituting in Equation 6 it is found that $$R_p = \frac{9 \times 10^{-3}}{2.5 \times 10^{-6}} = 3.6K$$

As previously indicated it is desired that if the current $I_1 = 3$ then the current $I_2 = 2$. This permits the net current to be changed from $3+2=5$ to $3-2=1$ and affords a five-to-one ratio of sensitivities. Since the ratio $$\frac{I_1}{I_2} = \frac{3}{2}$$

the ratio $$\frac{R_2}{R_1} = \frac{3}{2}$$

Thus knowing the ratio $R_2/R_1$ and the value of $R_p$ it is readily determined that $R_1 = 6K$ and $R_2 = 9K$. Resistor 24 need have a value of only 5.7K, however, and resistor 22 need have a value of only 8.7K, when the winding resistances 12 and 12a are considered.

The circle diagram shown in FIGURE 6 is also applicable for parallel aiding connection of FIGURE 4 with the switches in the position shown. Resistor 42 has a value of 3.6K which is equal to $R_p$. In order that the capacitive time-constant of the compensating circuit connected to contact 31a be equal to that of the parallel aiding inductive time-constant, capacitor 54 should have a value of $$\frac{2.5 \times 10^{-6}}{3.6 \times 10^3} = 694 \mu\mu$$

With the reversing switches 32 and 34 actuated to connect the windings in parallel opposing relationship, (8) $\quad E = I_1(R_1+SL) - SLI_2$ (9) $\quad E = I_2(R_2+SL) - SLI_1$ Solving Equations 8 and 9 simultaneously,

(10) $\quad I_1 = \dfrac{E(R_2+2SL)}{R_1R_2 + SL(R_1+R_2)}$

(11) $\quad I_2 = \dfrac{E(R_1+2SL)}{R_1R_2 + SL(R_1+R_2)}$

By differentially combining Equations 10 and 11 I obtain the net effective current which produces torquer flux

(12) $\quad I_1 - I_2 = \dfrac{E(R_2-R_1)}{R_1R_2 + SL(R_1+R_2)}$

It will be seen that Equation 12 is of the same form as Equation 5 except that in Equation 5 the numerator involves a sum whereas in equation 12 the numerator involves a difference. Accordingly, Equations 6 and 7 for obtaining the time-constant T apply whether the windings are connected in parallel aiding or parallel opposing fashion. From Equation 12 it will be noted that if $R_1$ is equal to $R_2$ with the windings connected in parallel opposition then $I_1-I_2=0$ and no net torquer flux is produced. Additively combining Equations 10 and 11 to find the total torquer current $I_t$

(13) $$I_t=I_1+I_2=\frac{E(R_1+R_2+4SL)}{R_1R_2+SL(R_1+R_2)}$$

It will be noted that Equation 13 involves time-constants both in the numerator and in the denominator. The time-constant in the denominator is the same as in Equations 12 and 5. However, an additional time-constant is present in the numerator of Equation 13 which is present in neither of Equations 5 and 12. From Equation 13 it will be noted that as complex frequency S increases without limit, $I_t$ approaches a certain limiting value $I_x$ where

(14) $$I_x=\frac{4E}{R_1+R_2}$$

From Equation 13, as complex frequency S approaches zero, $I_t$ approaches $I_o$, where

(15) $$I_o=\frac{E}{R_p}$$

The zero frequency and infinite frequency values of $I_t$ represented respectively by $I_o$ and $I_x$ can be equal to one another only if $R_1=R_2$. From Equation 12 it will be seen that this is a degenerate case since no useful torquer flux is produced. If the ratio $R_1/R_2$ is either greater or less than unity so that $R_1$ is not equal to $R_2$, then $I_t$ at zero frequency, represented by $I_o$, will exceed $I_t$ at infinite frequency, represented by $I_x$.

Referring now to FIGURE 7 it is again desired that the total current flowing between terminals 60 and 62 be a constant value $I_o$ which is in phase with the applied voltage E. As S becomes infinite $I_t$ approaches $I_x$ which is in phase with but less than $I_o$. As complex frequency S approaches zero, $I_t$ approaches $I_o$. The current $I_t$ may be considered as the sum of two current components one of which is the frequency independent component $I_x$ and the other of which is a frequency dependent component $I_y$. As S approaches zero, $I_y$ approaches $I_o-I_x$. As S becomes infinite $I_y$ lags E by 90° and approaches zero. It is desired to provide a current $I_c$ which compensates for the frequency dependent current component $I_y$. As S approaches infinity $I_c$ should be in phase with E and have a value equal to $I_o-I_x$. As frequency S approaches zero $I_c$ should lead E by 90° and approach zero. Differentially combining Equations 14 and 15 to obtain the current $I_c$ as S becomes infinite.

(16) $$I_o-I_x=\frac{E}{R_c}$$

where $R_c$ is the desired compensating resistance having a value

(17) $$R_c=\frac{R_n(R_1+R_2)}{R_1+R_2-4R_p}$$

From Equation 17 it will be seen that in the degenerate case of $R_1=R_2$, $R_c$ is infinite.

The time-constant $T_c$ associated with the current component $I_y$ is obtained from the numerator of Equation 13. Hence

(18) $$T_c=\frac{4L}{R_1+R_2}$$

It will be noted that the time-constant $T_c$ for the compensating circuit with the winding connected in parallel opposition differs from the time-constant T in Equation 6 for the compensating circuit with the windings connected in parallel aiding.

Substituting in Equation 17, the compensating resistance $$R_c=\frac{3.6\times10^3(6\times10^3+9\times10^3)}{6\times10^3+9\times10^3-4(3.6\times10^3)}=90K$$

which is the value shown for resistor 44. Substituting in Equation 18 the compensating circuit time-constant $$T_c=\frac{4(9\times10^{-3})}{6\times10^3+9\times10^3}=2.4\ \mu\text{sec}.$$

It will be noted that this time-constant is slightly less than the 2.5 $\mu$sec. time-constant of the compensating circuits for parallel aiding connections. However, this time-constant has no relationship to the net torquer flux and accordingly upon the inequivalency error. Thus the reduced time-constant $T_c$ does not reduce the inequivalency error. The required value of capacitor 56 is $$\frac{2.4\times10^{-6}}{90\times10^3}=26.7\ \mu\mu$$

With the switches in the position shown, the torquer is connected in parallel aiding for high sensitivity requiring a time-constant of the compensating circuit of 2.5 $\mu$sec. Upon simultaneous actuation of all switches, the windings are connected in parallel opposition for low sensitivity; and the compensating circuit provides a time-constant of 2.4 $\mu$sec. Irrespective of the polarity of the parallel connection of the windings, the impedance between terminals 60 and 62 is a pure 3.6K resistance.

The currents through the windings exponentially approach the same final value whether connected in aiding or opposing relationship; and the time-constants are nearly the same. Accordingly, the $I^2R$ power loss of each winding and spatial distribution of power dissipation remain, for practical purposes, absolutely constant.

It will be appreciated that in FIGURE 4 I may instead provide the torquer windings shown in FIGURE 3 having a turns ratio of three-to-two. In such event, the currents through the two parallel branches should be equal irrespective of the reversal of the direction of current in that parallel branch having the winding with only two turns. This would again give a five-to-one ratio of sensitivities. Equal current flow may be obtained despite the difference in lengths of wire in the coils if the total resistance of each of the parallel branches is the same. This may be accomplished either by employing unequal auxiliary resistors in series with the windings, assuming them to be wound with wires of the same size, or by forming the windings with wires of unequal cross-sectional areas so that the winding resistances are themselves equal. However, as will be appreciated by those ordinarily skilled in the art, the design equations would require alterations, since mutual inductance would no longer equal self-inductance.

Referring now to FIGURE 5, torquer windings 2 and 3 have equal numbers of turns and may each have an inductance of 9 mh. However, winding 2 has a resistance value 12 of 300 ohms while winding 3 has an associated resistance value 13 of only 75 ohms. Winding 3 is wound with wire of the same material as the winding 2 but having twice the diameter and hence four times the area and correspondingly one-quarter the resistance. Windings 2 and 3 are formed from a simultaneously wound bifilar pair of conductors so that the spatial distribution of the two windings is substantially identical; and each turn of one winding is in intimate thermal contact with a corresponding turn of the other winding. Terminal 60 is connected to the armature of a single-throw switch 33. Winding 2 is connected in series with an 8.7K resistor 22 between the contact of switch 33 and contact 34b of double-throw switch 34. Winding 3 is connected in series with a 3.525K resistor 26 between terminal 60 and contact 34a. Contacts 34a and 34b are shunted by a 2.4K resistor 28. Terminal 62 is again connected to the armatures of switches 34 and 31. Again terminal 60 is serially connected through 90K resistor 44 and 26.7 $\mu\mu$ capacitor 56 to contact 31b, and is also serially connected through 3.6K resistor 42 and 694 $\mu\mu$ capacitor 54 to contact 31a.

From the indicated polarity markings it will be noted that in the positions of the switches shown, the windings are connected in parallel opposition to produce low sensitivity. It is desired that the ratio of the current in the low resistance winding 3 to the current in the high resistance winding 2 be three-to-two. Because of the parallel opposing connection the net current will be 3−2=1. Upon actuation of switches 33 and 34 to produce high sensitivity, winding 2 is disconnected so that its current drops to zero; and the current through the low resistance winding 3 is simultaneously increased to a value of 5. This produces a five-to-one ratio of sensitivities. Furthermore, it will be seen that the total torquer current flowing in each case is the same, since 3+2=5+0=5. It will be appreciated that electronic gates may be employed in place of the relay switches shown for higher speed of response.

With the switches in the low sensitivity position shown and, as in FIGURE 4, assuming a coefficient of coupling of unity then the mutual inductance between windings 2 and 3 will be substantially equal to the self-inductance of either winding. The equations derived in conjunction with the parallel opposing connection of FIGURE 4 are applicable. Again assuming that the time-constant of the torquer must not exceed 2.5 $\mu$sec. to reduce inequivalence error to less than $10^{-6}$, from Equation 6 it is again found that $R_p$=3.6K. Since the ratio of currents is three-to-two as in the parallel opposing connection of FIGURE 4, again $R_1$=6K and $R_2$=9K. Again resistor 22 need have a value of only 8.7K. Upon the actuation of switches 30 and 34 to the high sensitivity position so that the armature of switch 34 engages contact 34a, the torquer impedance should again be 3.6K. Accordingly, resistor 26 need have a value of only 3.525K. Resistor 28 should have a value of 6K−3.6K=2.4K in order that the actuation of switch 34 cause the current through winding 3 to change from a value of 3 to a value of 5. The compensating circuits in FIGURE 5 are derived from the equations applicable for FIGURE 4 and are identical.

With the windings connected in parallel opposition for low sensitivity as shown, the power losses, assuming the currents are expressed in milliamperes, are $$300(2 \times 10^{-3})^2 = 1.2 \text{ milliwatts}$$

in winding 2 and $75(3 \times 10^{-3})^2$=.675 mw. in winding 3, yielding a total power loss for both windings of 1.875 mw. With winding 3 connected for high sensitivity, the power loss is $75(5 \times 10^{-3})^2$=1.875 mw. In the high sensitivity position this comprises the only power loss since the current in winding 2 is zero. Because inductances 2 and 3 are formed from a pair of simultaneously wound wires, changes in the spatial distribution of power for the high and low sensitivity connections are limited to the diameter of a single wire. For practical purposes changes in the spatial distribution of power and accordingly of temperature gradients for the high and low sensitivity connections are negligible, since each turn of one winding is in good thermal contact with a corresponding turn of the other winding. Since the total power dissipated by the torquer circuit for high and low sensitivities is the same and since the power dissipated in the resistance of the windings themselves is the same, it follows that the power dissipated in resistors 22, 26 and 28 must be the same. Accordingly, resistors 22, 26 and 28 should be closely mounted in thermal contact to form a single composite body the temperature of which remains constant. In this respect the close mounting of the resistors in thermal engagement is analogous to the thermal engagement of the bifilar torquer windings.

FIGURE 5 comprises the best embodiment of a configuration where the currents in both windings are simultaneously varied. For example, for low sensitivity the current through winding 3 may be 9 ma. and the opposing current through winding 2 may be 8 ma. to yield a net current of 9−8=1 ma.; and for high sensitivity the current through winding 3 may be increased to 11 ma. while the opposing current through winding 2 may be reduced to 6 ma. yielding a net current of 11−6=5 ma. In such event the resistance of winding 3 should be 0.7 times that of winding 2, or 210 ohms. Thus in the example given, for low sensitivity the total power dissipated is $$210(9 \times 10^{-3})^2 + 300(8 \times 10^{-3})^2$$
$$= (17 + 19.2)10^{-3} = 36.2 \text{ mw.}$$

while for high sensitivity the total power dissipated is $$210(11 \times 10^{-3})^2 + 300(6 \times 10^{-3})^2$$
$$= (25.4 + 10.8)10^{-3} = 36.2 \text{ mw.}$$

However, the total current in each case is $$9 + 8 = 11 + 6 = 17 \text{ ma.}$$

which is much greater than the 5 ma. current for the values given in FIGURE 5. Furthermore, the power dissipated in the torquer of 36.2 mw. in the example given is much greater than the 1.875 mw. dissipated for the values shown in FIGURE 5. It will be appreciated therefore that the best embodiment of a circuit in which the currents in both windings are simultaneously varied is one for which one winding has, for the high sensitivity connection, no opposing current flow. It will be seen that the current drain in FIGURE 5 is no larger than in FIGURE 4, being 5 ma. in both cases. In the circuit of FIGURE 5 it is not desirable to have unequal turns and consequently different lengths of wire for the windings 2 and 3 since in such event the windings would no longer have the same spatial distribution.

In FIGURE 5, the opposing current flow through winding 2 is reduced to zero for high sensitivity. However, it will be appreciated that for high sensitivity, the current flow through winding 2 may be reversed in polarity to yield a parallel aiding effect. For example, for high sensitivity the current through winding 3 may be set at only 4 ma. (instead of 5 ma.) and winding 2 may pass an aiding current of 1 ma. to yield a net current of 4+1=5 ma. In such event the resistance of winding 3 should be 128.6 ohms. The total power loss for high sensitivity is $$128.6(4 \times 10^{-3})^2 + 300(1 \times 10^{-3})^2$$
$$= (2.058 + 0.3)10^{-3} = 2.358 \text{ mw.}$$

which is the same as for low sensitivity, since $$128.6(3 \times 10^{-3})^2 + 300(2 \times 10^{-3})^2$$
$$= 1.158 + 1.2)10^{-3} = 2.358 \text{ mw.}$$

However the switching circuitry would become more complex in order to reverse the polarity of winding 2. It will be noted that if the aiding current through winding 2 for high sensitivity is further increased to 2 ma., and the current through winding 3 correspondingly reduced to 3 ma., then the circuit of FIGURE 5 reduces to that of FIGURE 4.

Thus far it has been assumed that the torquer windings are uncompensated and produce appreciable cross-field armature flux. It is well known by those ordinarily skilled in the art that uncompensated armature windings have relatively high inductances. I may, of course, provide additional compensating windings on the torquer field structure to neutralize the cross-field armature flux and thus decrease the net inductance to the leakage flux in the air gap. This permits the use of smaller loading resistors, reducing the impedance between terminals 60 and 62, while maintaining the same inductive time-constant. This requires corresponding changes in both the resistance values and in the capacitive time-constants of the compensating circuits. Each compensating winding mounted on the field structure has the same construction as a corresponding armature winding shown. Corresponding armature and compensating windings are connected in series.

It will be seen that I have accomplished the objects of my invention. My variable amplitude pulse torquer presents a constant impedance to a current source and draws constant current. The average power dissipation of my torquer is constant. The spatial distribution of power is for practical purposes absolutely constant so that temperature gradients are not disturbed. By the use of a capacitive compensating circuit my torquer presents a purely resistive impedance independent of frequency.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A variable amplitude pulse torquer including in combination a first and a second magnetically coupled winding having equal numbers of turns and unequal resistances, means connecting the windings in parallel opposing relationship, a switching device connected to the windings and selectively actuatable among a plurality of discrete states, means responsive to a first state of the device for providing winding currents which satisfy the relationships $$I_1+I_2=A$$
$$I_1-I_2=B$$

and means responsive to a second state of the device for providing winding currents which satisfy the relationships $$I_1+I_2=A$$
$$I_1-I_2=C$$

where B and C are unequal and positive, where $I_1$ and $I_2$ are the respective opposing currents through the first and second windings, and where $I_1 > I_2 \geqq 0$ in each state of the device.

2. A variable amplitude pulse torquer including in combination a first and a second magnetically coupled winding, means connecting the windings in parallel, a switching device connected to the windings and selectively actuatable among a plurality of discrete states, means responsive to a first state of the device for providing winding currents which satisfy the relationships $$|I_1|+|I_2|=A$$
$$N_1I_1+N_2I_2=B$$

and means responsive to a second state of the device for providing winding currents which satisfy the relationships $$|I_1|+|I_2|=A$$
$$N_1I_1+N_2I_2=C$$

where B and C are unequal and of the same sign, where $N_1$ and $N_2$ are the turns of and where $I_1$ and $I_2$ are the currents through the respective first and second windings, and where $I_1$ and $I_2$ have associated signs indicative of the polarity of current flow through a winding.

3. A variable amplitude pulse torquer including in combination a first and a sound magnetically coupled winding, a switching device connected to the windings and selectively actuatable among a plurality of discrete states, means responsive to a first state of the device for providing winding currents which satisfy the relationships $$|I_1|+|I_2|=A$$
$$N_1I_1+N_2I_2=B$$

and means responsive to a second state of the device for providing winding currents which satisfy the relationships $$|I_1|+|I_2|=A$$
$$N_1I_1+N_2I_2=C$$

where B and C are unequal and of the same sign, where $N_1$ and $N_2$ are the turns of and where $I_1$ and $I_2$ are the currents through the respective first and second windings, and where $I_1$ and $I_2$ have associated signs indicative of the polarity of current flow through a winding.

4. A variable amplitude pulse torquer including a combination a pair of magnetically coupled windings, means connecting the windings in parallel opposition to form a circuit, the circuit having a purely resistive impedance $R_o$ at zero frequency and a purely resistive impedance $R_x$ at infinite frequency, where $R_x$ exceeds $R_o$, a capacitive compensating network comprising a resistor, and means shunting the circuit with the network, the compensating network resistor having a value $R_c$, where $$R_c = \frac{R_x R_o}{R_x - R_o}$$

5. A variable amplitude pulse torquer including in combination a pair of magnetically coupled windings having equal self-inductances L, means connecting the windings in parallel opposition to form a circuit, the circuit having a purely resistive impedance at zero frequency and a purely resistive impedance $R_x$ at infinite frequency, where $R_x$ exceeds the zero frequency impedance, and a capacitive compensating network shunting the circuit, the compensating network having a time-constant $T_c$, where $$T_c = \frac{L}{R_x}$$

6. A variable amplitude pulse torquer including in combination a pair of magnetically coupled windings, a first and a second switching device connected to the windings, means synchronously actuating the devices, means including the first device and the windings for selectively forming two circuits having a common pair of terminals, means providing each circuit with the same purely resistive impedance value at zero frequency, a pair of capacitive networks, means including the second device for selectively shunting the terminals with the networks, and means providing the networks with such impedances that the resultant impedance presented between the terminals is equal to said purely resistive impedance value independent of frequency.

7. A variable amplitude pulse torquer including in combination a pair of magnetically coupled windings, a switching device connected to the windings, means including the device and the windings for selectively forming two circuits having a common pair of terminals, means providing each circuit with the same purely resistive impedance value at zero frequency, and means including a capacitive network shunting the terminals for causing the resultant impedance presented therebetween to be equal to said purely resistive impedance value independent of frequency.

8. A variable amplitude pulse torquer including in combination a first and a second magnetically coupled winding having equal numbers of turns, means connecting the windings in parallel opposing relationship, a switching device connected to the windings and selectively actuatable among a plurality of discrete states, means responsive to a first state of the device for providing winding currents which satisfy the relationships $$R_1I_1^2+R_2I_2^2=A$$
$$I_1-I_2=B$$

and means responsive to a second state of the device for providing winding currents which satisfy the relationships $$R_1I_1^2+R_2I_2^2=A$$
$$I_1-I_2=C$$

where B and C are unequal and positive, where $R_1$ and $R_2$ are the resistances of and where $I_1$ and $I_2$ are the opposing currents through the respective first and second windings, and where $I_1 > I_2 \geqq 0$ in each state of the device.

9. A variable amplitude pulse torquer including in combination a first and a second magnetically coupled winding, means connecting the windings in parallel, a switching device connected to the windings and selectively actuatable among a plurality of discrete states, means responsive to a first state of the device for providing winding currents satisfying the relationships $$R_1I_1^2 + R_2I_2^2 = A$$
$$N_1I_1 + N_2I_2 = B$$

and means responsive to a second state of the device for providing winding currents satisfying the relationships $$R_1I_1^2 + R_2I_2^2 = A$$
$$N_1I_1 + N_2I_2 = C$$

where B and C are unequal and of the same sign, where $R_1$ and $R_2$ are the resistances of and where $N_1$ and $N_2$ are the turns of and where $I_1$ and $I_2$ are the currents through the respective first and second windings, and where $I_1$ and $I_2$ have associated signs indicative of the polarity of current flow through a winding.

10. A variable amplitude pulse torquer including in combination a first and a second magnetically coupled winding, a switching device connected to the windings and selectively actuatable among a plurality of discrete states, means responsive to a first state of the device for providing winding currents satisfying the relationships $$R_1I_1^2 + R_2I_2^2 = A$$
$$N_1I_1 + N_2I_2 = B$$

and means responsive to a second state of the device for providing winding currents satisfying the relationships $$R_1I_1^2 + R_2I_2^2 = A$$
$$N_1I_1 + N_2I_2 = C$$

where B and C are unequal and of the same sign, where $R_1$ and $R_2$ are the resistances of and where $N_1$ and $N_2$ are the turns of and where $I_1$ and $I_2$ are the currents through the respective first and second windings, and where $I_1$ and $I_2$ have associated signs indicative of the polarity of current flow through a winding.

11. A variable amplitude pulse torquer including in combination a magnetic core, a pair of windings having certain resistances linking the core, a source providing a constant absolute value of current, a switching device connected to the windings, means including the device and the windings for selectively forming two circuits having a common pair of terminals, means providing each circuit with the same purely resistive impedance value at zero frequency, means coupling the source to the terminals to excite the circuits, means for causing each excited circuit to produce the same total power dissipation in the winding resistances, means for causing one excited circuit to produce a certain constant absolute value of flux in the magnetic core, and means for causing the other excited circuit to produce a different constant absolute value of flux in the magnetic core.

12. A variable amplitude pulse torquer as in claim 11 which further includes means providing each circuit with said purely resistive impedance value at all frequencies.

13. A variable amplitude pulse torquer as in claim 11 in which the windings have certain spatial distributions and in which each excited circuit produces substantially the same spatial distribution of power dissipation in the windings.

References Cited

UNITED STATES PATENTS

| | | | |
|---|---|---|---|
| 2,817,773 | 12/1957 | McKenney | 307—106 |
| 3,260,910 | 7/1966 | Spindler | 318—225 |
| 3,263,144 | 7/1966 | Neyhouse et al. | 318—224 |

MILTON O. HIRSHFIELD, *Primary Examiner.*

J. J. SWARTZ, J. J. GIBBS, *Assistant Examiners.*

UNITED STATES PATENT OFFICE
CERTIFICATE OF CORRECTION

Patent No. 3,337,754            August 22, 1967

John V. Hughes

It is hereby certified that error appears in the above numbered patent requiring correction and that the said Letters Patent should read as corrected below.

Column 11, line 57, for "sound" read -- second --; column 12, line 1, for "a" read -- in --.

Signed and sealed this 16th day of July 1968.

(SEAL)
Attest:

Edward M. Fletcher, Jr.
Attesting Officer

EDWARD J. BRENNER
Commissioner of Patents